United States Patent Office 3,380,550
Patented Apr. 30, 1968

3,380,550
CONTROLLABLE PRIMING MEANS FOR THE CUSHION OF AIR CUSHION VEHICLES
Richard Stanton Jones, Cowes, Isle of Wight, England, assignor to Westland Aircraft Limited, Yeovil, England
Filed July 30, 1965, Ser. No. 476,059
Claims priority, application Great Britain, Aug. 28, 1964, 35,291/64
12 Claims. (Cl. 180—128)

ABSTRACT OF THE DISCLOSURE

An air cushion vehicle with a flexible skirt including controllable priming means for priming the air support cushion.

---

This invention relates to air cushion vehicles, and in particular to an improved arrangement for the supply of pressurised air or gas to the air cushion upon which the vehicle is supported.

It is an object of the invention to speed up the transition of an air cushion vehicle from the waterborne or groundborne state, to the cushionborne state, and a further object is to provide an air cushion vehicle which will retain its stability in circumstances when air is temporarily prevented from issuing from part of the jet nozzle system.

According to the invention I provide an air cushion vehicle with at least one duct which acts as a passage for the transfer of pressurised air or gas from the pressure generating means to at least one jet nozzle which generates and maintains at least one air cushion upon which the vehicle is supported, and means within said duct to prime with pressurised air or gas the said air or gas cushion.

According to a further aspect of the invention I provide an air cushion vehicle having a double walled skirt assembly which acts as at least a part of the barrier to the escape of the pressurised air or gas from the cushion or cushions by which the vehicle is supported and at least a part of the duct or ducts for the transfer of pressurised air or gas from the pressure generating means to the jet nozzles, the inner wall of the said skirt assembly being provided with passages or ports which interconnect the said duct or ducts and the said air cushion or cushions.

When an air cushion vehicle fitted with a flexible skirting assembly which has jet nozzles in the region of its lower extremity has been operating or resting on the water as a displacement craft those parts of the ducts to the nozzles which are below the waterline become full of water. If the skirting assembly extends downwards into the water without being retracted towards the buoyant part of the vehicle the pressure created at the jet nozzles by the head of water may be such that the air pressure generating means is not able to force air out of the jet nozzles until the nozzles have been raised. This may result in the transition of the vehicle from the waterborne to the cushionborne state being prolonged. In order to reduce the duration of this transition, arrangements have been provided which prime the air cushion area with pressurised air, that is to say, which supply pressurised air from the ducts to the said cushion area by supply ports additional to the jet nozzles.

When an air cushion vehicle is cushionborne, and there is relative motion between the vehicle and the surface over which it is operating the skirt may be deflected as a result of striking a wave or an obstruction. This may result in the jet nozzle in that part of the skirt which is deflected being restricted and, if the deflection force is stronger than the air pressure in the skirt, attenuation of the jets at that point on the vehicle can occur and may affect the stability. Thus, vehicle stability also may be maintained by priming the air cushion area with pressurised air.

The invention will now be described by way of example, with reference to the accompanying drawings, in which.

Figure 1:
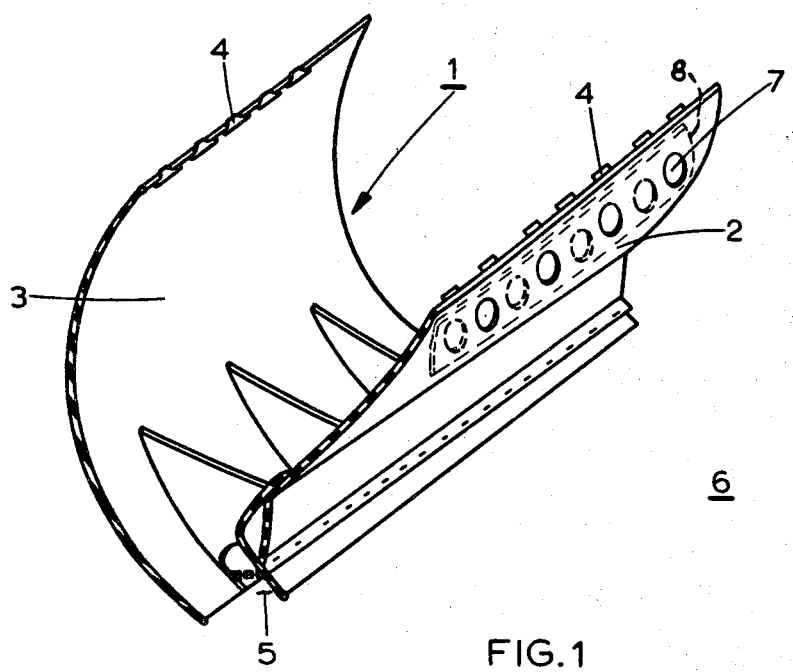
FIGURE 1 is a perspective illustration of a section of a skirt with holes connecting the pressurised skirt to the air cushion area.
Figure 2:
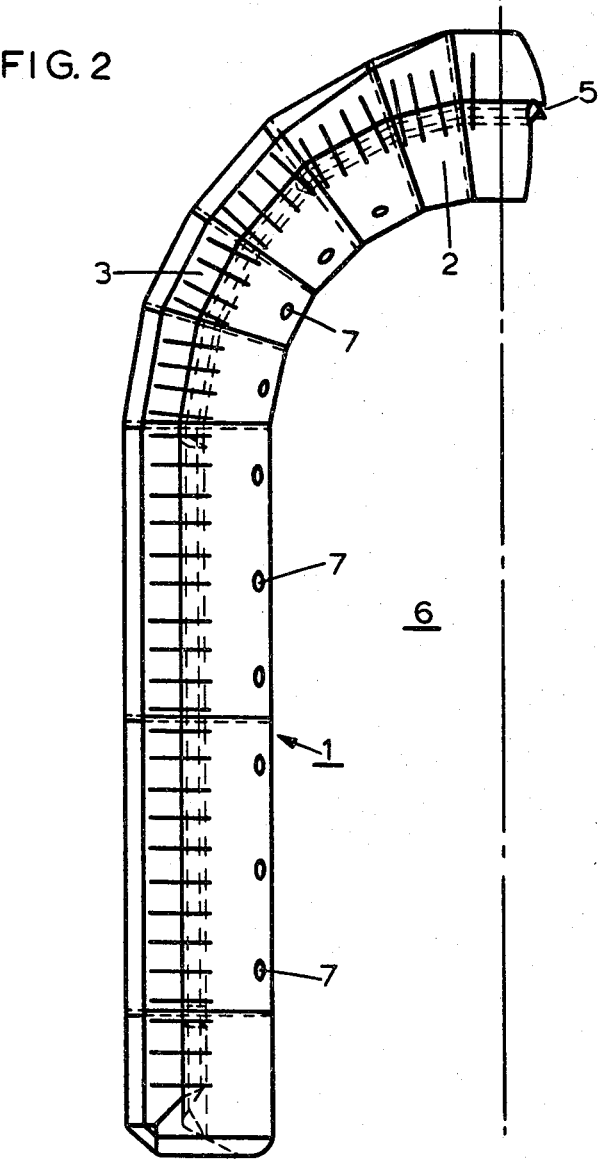
FIGURE 2 is a plan showing half the skirting of an air cushion vehicle provided with priming ports.

In one embodiment of the invention we provide a flexible duct generally indicated at 1, comprising an inner wall 2, and an outer wall 3, of flexible airtight material which depends from the rigid supply duct of an air cushion vehicle (not shown) to which it is attached by the fastenings 4. The duct 1 conducts pressurised air from the fan plenum chamber in the rigid part of the vehicle to the jet nozzles 5, and forms the upper flexible barrier to the air cushion 6, by which the vehicle is supported. Pressurised air issuing from the nozzles 5 forms and maintains the air cushion and acts as the lower fluid barrier to the air cushion. A plurality of holes 7, in the upper part of the inner duct wall 2, feed air from the duct 1 to the air cushion 6. Thus, even when no air can issue from the nozzles 5, the air cushion 6 can be generated and maintained.

In order to obtain both adequate stability and rise characteristics when starting up, the area of the holes should preferably not be less than five percent of the total nozzle exit area at the bottom of the skirt, and in order to avoid undue performance loss should not be greater than twenty percent of the total nozzle exit area.

In a further embodiment of the invention the holes are arranged so that the passage of air through them is controlled either manually or automatically by means of slides or shutters 8, as shown dotted in FIGURE 1 of the drawings, which could be built into or onto the skirt material and actuated from the cabin by means of cables. Alternatively, simple spring-loaded relief valves could be provided in the ports 7 designed to open when air pressure within the duct rose above a predetermined value. Relief valves communicating with the plenum chamber could also be incorporated in the solid ducting, if required, and flow need not take place unless air ceases to issue from the jet nozzles.

It will be appreciated that numerous modifications could be made which would still be within the scope of the invention. For example, the invention need not be restricted to peripheral jet air cushion vehicles with skirts, but can be applied equally to the sidewall type with jets at the lower tips of the sidewalls, or to any type of air cushion vehicle in which the supply of air to the air cushion issues from jets which are situated in the lower part of the air cushion.

It will also be understood that the position of the ports 7 around the inner skirt is not critical, but for preference should be as near as possible to the top of the skirting assembly.

I claim as my invention:

1. An air cushion vehicle having a body with at least one duct, depending therefrom, said duct having a jet nozzle opening at the lower portion thereof and acting as a passage for the transfer of pressurised air from a pressure generating means on said vehicle to said jet nozzle for creating a jet sheet curtain which generates and maintains at least a portion of the air cushion upon which the vehicle is supported, means in said duct and communicating with said cushion for priming with pressurised air the said air cushion and means operatively associated with said priming means for variably controlling said priming means to control the flow of fluid therethrough.

2. An air cushion vehicle as claimed in claim 1, wherein said duct forms a part of the barrier to the escape of the pressurised air which forms the cushion.

3. An air cushion vehicle as claimed in claim 2, wherein said priming means are situated adjacent to the upper region of said duct.

4. An air cushion vehicle as claimed in claim 2, in which at least a part of said duct is flexible.

5. A vehicle as claimed in claim 1 wherein said priming means comprises at least one passage from said duct to said cushion.

6. A vehicle as claimed in claim 5 wherein said means for variably controlling said priming means comprises a relief valve for opening when the duct pressure rises above a predetermined value.

7. A vehicle as claimed in claim 5 wherein said means for variably controlling said priming means comprises a slide member for slidably opening and closing said at least one passage under the control of the operator of the vehicle.

8. A vehicle as claimed in claim 5 wherein said means for variably controlling said priming means comprises shutter means for opening and closing said at least one passage under the control of the operator of the vehicle.

9. An air cushion vehicle provided with a double walled skirt depending therefrom and assembly having jet nozzles formed at the lower end thereof, said assembly acting as at least a part of the barrier to the escape of the pressurised air from the cushion by which the vehicle is supported and as at least a part of the duct for the transfer of pressurised air from a pressure generating means carried by said vehicle to the jet nozzles, the inner wall of the said skirt assembly being provided with ports which interconnect the said duct and the said air cushion, and means operatively associated with said ports for variably controlling the opening of said ports so as to variably control the flow of air therethrough.

10. An air cushion vehicle, as claimed in claim 9, wherein the total area of said ports is not less than five percent of the total nozzle exit area, but not greater than twenty percent.

11. An air cushion vehicle provided with depending side walls including supply ports at the lower tips of the sidewalls and from which pressurised air issues to generate and maintain an air cushion by which the vehicle is at least partially supported, a duct within the sidewalls for the transfer of pressurised air from a pressure generating means on the vehicle to the supply ports, passages in said sidewalls communicating with said duct and the said cushion, and means operatively associated with said passages for variably controlling said passages so as to variably control the flow of air therethrough.

12. An air cushion vehicle with at least one duct, which acts as a passage for the transfer of pressurized air from the pressure generating means to at least one jet nozzle which generates and maintains at least one air cushion upon which the vehicle is supported, and means for priming with pressurized air the said air cushion, said priming means comprising passages for the transfer of pressurized air interconnecting the said duct and the said air cushion, the total area of said priming passages being not less than 5% of the total nozzle exit area, but not greater than 20% thereof.

References Cited
UNITED STATES PATENTS 3,291,239   12/1966   Eggington et al. _____ 180—7

A. HARRY LEVY, *Primary Examiner*.